Patented Aug. 22, 1950

2,519,540

UNITED STATES PATENT OFFICE 2,519,540

MANUFACTURE OF DIETHYL ACETAL

Peter Lionel Bramwyche, London, Martin Mugdan, Richmond, and Herbert Muggleton Stanley, Tadworth, England, assignors to The Distillers Company, Limited, Edinburgh, Scotland, a British company No Drawing. Application September 10, 1947, Serial No. 773,298. In Great Britain September 18, 1946

7 Claims. (Cl. 260—615)

This invention is for improvements in or relating to the manufacture of diethyl acetal.

It is well known that aldehydes and alcohols interact in the presence of an acidic catalyst, such as sulphuric acid, to form acetals; the reaction proceeds until an equilibrium is reached and thus very substantial quantities of aldehyde and of alcohol remain unreacted. The unreacted aldehyde and alcohol have to be removed, for instance by distillation when the acetal is isolated, and recovered. The separation of these different substances, however, meets with considerable difficulties as the water produced during the reaction forms binary and ternary azeotropes with the alcohol and the acetal. In order to overcome this difficulty it has been suggested to carry out the reaction in the presence of salts, particularly calcium chloride, which combine with water.

It is an object of this invention to effect the conversion of acetaldehyde in the formation of diethyl acetal with a much higher yield than obtained hitherto. It is another object to provide a process which facilitates the recovery and separation of the unreacted aldehyde and alcohol after the reaction is complete.

According to the present invention there is provided a process for the manufacture of diethyl acetal which comprises reacting acetaldehyde with ethanol in the presence of an acidic catalyst and in the presence of an inert diluent, substantially immiscible with water and having a distribution coefficient for the acetal in relation to water which is at least double that for the alcohol and the aldehyde, in an amount at least sufficient to cause the major proportion of the water in the reaction mixture to separate out as an aqueous phase, intimately mixing the reactants during the reaction, either continuously or intermittently, with the said diluent, separating the two phases formed and recovering the acetal from the diluent phase by distillation; the aqueous phase may also be distilled or otherwise treated for the recovery of the acetal content thereof.

Diluents which may be used in carrying out the process of the invention and which have the required properties include liquid hydrocarbons, such as are obtained as fractions in the refining of petrols. These hydrocarbons possess, under the conditions under which the condensation of the aldehyde with the alcohol to form the acetal is conducted, a distribution coefficient for the acetal between the diluent and the aqueous phase which is many times greater than that for the alcohol and the aldehyde. Liquid chlorinated hydrocarbons, for example, carbon tetrachloride, may also be used as diluents in the process of the invention provided that they possess the requisite above-mentioned properties. The choice of the diluent to be employed depends also on the method by which the acetal is ultimately recovered. We prefer to use diluents which do not form azeotropes with the acetal, advantageously such as have a boiling point sufficiently different from that of the acetal to allow an easy separation from said acetal by distillation. Diluents with a boiling point of between 120° C. and 200° C. are preferred. It is possible, however, to employ low-boiling diluents such as some of the hydrocarbons obtained in the refining of petrols so that after previously distilling off the unreacted aldehyde, the alcohol can be separated from the acetal by a fractional distillation and then be returned to the reaction in conjunction with the diluent.

The quantities of aldehyde and alcohol taken are preferably such that an excess of either one or the other is present in the reaction mixture. It is preferred to use a slight excess of the alcohol, for example an amount of 10 to 20% of the theoretical amount based on the quantity of aldehyde taken.

The addition of the liquid diluent may be made on mixing the aldehyde with the alcohol and the catalyst or it may be added after the reaction has started. When the diluent is present from the beginning of the reaction, the mixture soon becomes turbid by virtue of the water formed during the reaction separating from the diluent. Care has to be taken that the diluent is properly mixed with the reaction mixture, whether the diluent is added to the reaction mixture at the start or after the reaction has begun so that the diluent comes into intimate contact with the aqueous phase. It is not necessary to maintain the intimate contact all the time whilst the reaction takes place; it is, however, preferable, if the mixing of the two phases is carried out intermittently, to effect such mixing frequently.

The catalyst, which may be sulphuric acid, phosphoric acid or compounds of a similar acidic nature known to catalyse the formation of acetals may, if desired, be neutralised before recovery of the acetal. We prefer to use sulphuric acid as the catalyst.

The present invention however, also makes it possible to omit the usually troublesome step of neutralisation, as the acidic catalyst goes practically completely into the aqueous phase in which only minor amounts of the acetal are present.

The aqueous layer may be distilled without having been neutralised beforehand. The acid present in said layer converts the acetal into the aldehyde and alcohol which in conjunction with the unreacted aldehyde and alcohol, are distilled off and may be returned to the reaction. When the aqueous layer is neutralised before the distillation, the acetal, aldehyde and alcohol distil over and may either be returned to the reaction or worked up for the recovery of the acetal.

The process of the invention may be carried out batchwise or continuously. In the latter case, the reactants and the diluent together with the catalyst are fed continuously or periodically into a system where they are brought into intimate contact and from which the mixture is withdrawn continuously or periodically after the reactants have been in contact with each other for a sufficient time to allow the reaction to take place, and passed on to a device in which the two phases are allowed to separate. This also may be effected continuously or intermittently, for instance in a centrifuge, or in a settling container from which, after standing, the two phases are separated by decantation.

We prefer to carry out the reaction at a temperature below 30° C., and most advantageously between 15° and 20° C. Lower temperatures increase to some extent the conversion of the aldehyde into the acetal. On the other hand, a longer period is required to establish the final equilibrium. The separation of the diluent phase from the aqueous phase may be accomplished, however, before this stage of the final equilibrium is reached, if so desired.

The process of the invention offers the further advantage that it is not necessary for the production of diethylacetal to employ the ethanol in the form of absolute alcohol as was generally the case in the known methods and we have found that ethanol of a concentration of 95% by volume or even less may be used without substantially affecting the yield obtainable by the process of the invention.

It is advisable to mix the acetaldehyde with the ethanol and to remove the heat produced thereby prior to mixing with the acidic catalyst. This applies especially to a continuous process in which the acidic catalyst is introduced into the system separately from the mixture of acetaldehyde and ethanol with the diluent.

The mixing of the reaction mixture with the liquid diluent may be carried out with advantage by passing the reactants through narrow tubes, the inner diameter and the length of which are chosen in such a way and the rate of flow of the mixture through said tubes is adjusted in such a manner that the turbulence caused thereby brings about the desired intimate contact between the phases whilst the residence time in the tube or tubes corresponds to the desired reaction time.

The following examples illustrate the manner in which the invention may be carried into effect, the percentage figures being calculated by weight.

Example 1.—12.7 mols of acetaldehyde were mixed with 28 mols of absolute ethanol i. e. an alcohol excess of 10%, and with kerosene (B. Pt. approx. 190° C.) in an amount of about three times the volume of the mixture of the acetaldehyde and ethanol. 20 ccs. of 98% sulphuric acid were then dissolved in the liquid mixture. The reaction mixture remained clear for some seconds but then suddenly turned cloudy and, on standing, a large aqueous layer rapidly separated out below the solution. The reaction mixture was then agitated during 30 minutes and maintained at a temperature of 20° C., during which time the water layer decreased in volume in consequence of the continuing formation of the acetal in this layer and its extraction by the solvent. The catalyst remained substantially completely in the lower aqueous layer. The upper organic layer contained only a trace of water. The following table shows the result obtained:

| | Mols of acetal present | Per cent by mol of acetal based on aldehyde taken | Mols of free aldehyde present | Per cent by mol of free aldehyde based on aldehyde taken |
|---|---|---|---|---|
| Kerosene layer | 10.15 | 80 | 1.32 | 10.4 |
| Aqueous layer | 0.34 | 2.7 | 0.88 | 6.9 |

82.7% of the acetaldehyde employed was converted into the acetal. In the absence of the inert diluent the conversion of acetaldehyde at the equilibrium is about 55%.

A similar result was obtained when the reactants were first mixed with the catalyst and then agitated with the kerosene. With ethanol of a concentration of 95% by volume, the conversion of the acetaldehyde to acetal was about 76% at 20° C.

Example 2.—An experiment was carried out under conditions identical to those in Example 1 and using the same proportions of reactants, the only difference being that in place of the kerosene, benzene was used as the diluent. The result was that the diluent layer contained 77.2% of acetal and 21.7% of unchanged aldehyde, both percentages being based on the aldehyde taken. The aqueous layer contained a total of 2.5% of acetal and acetaldehyde based on the aldehyde taken, the acetal being calculated as the equivalent amount of aldehyde.

Example 3.—This experiment was carried out as in Example 1 but in place of the kerosene, n-hexane was used as the diluent. The final diluent layer contained 78.5% of acetal and 12.2% of unchanged aldehyde, both percentages being based on the aldehyde taken. The final aqueous layer contained a total of 8.7% of acetal and acetaldehyde based on the aldehyde taken, the acetal being calculated as the equivalent amount of aldehyde.

Example 4.—A further experiment was carried out just as in Example 1 but in place of the kerosene, carbon tetrachloride was used as the diluent. The final diluent layer contained 82% of acetal and 11% of unchanged aldehyde, both percentages being based on the aldehyde taken. The final aqueous layer contained a total of 4.9% of acetal and acetaldehyde based on the aldehyde taken, the acetal being calculated as the equivalent amount of aldehyde.

We claim:

1. A process for manufacturing diethylacetal which comprises reacting acetaldehyde with ethanol in the presence of an acidic catalyst and of an inert organic solvent for acetal which is substantially immiscible with water, has a distribution coefficient for the acetal in relation to water which is at least double that for the alcohol and the aldehyde with respect to water, and does not form an azeotrope with the acetal, in amount at least sufficient to cause a major proportion of the water in the reaction mixture to separate out as an aqueous phase as formed, separating the two phases formed and recovering the acetal from the organic liquid phase by distillation.

2. A process as claimed in claim 1 wherein the reaction is carried out at a temperature between 15° and 20° C.

3. A continuous process for the manufacture of diethyl acetal wherein ethanol, acetaldehyde, an acidic catalyst and an inert diluent, substantially immiscible with water and having a distribution coefficient for diethyl acetal in relation to water which is at least double that for the alcohol and the aldehyde with respect to water and does not form an azeotrope with the acetal, in an amount which is at least sufficient to cause the major proportion of the water in the reaction mixture to separate out as an aqueous phase, are fed into a reaction system wherein they are intimately admixed and from which the resulting mixture is withdrawn at a rate corresponding substantially to the input rate, after the reactants have been in contact with each other for a sufficient time to allow the reaction to occur, and wherein the withdrawn mixture is separated into the two phases formed, and the formed acetal is recovered from the diluent phase by distillation.

4. A process according to claim 1 wherein said inert organic liquid is kerosene.

5. A process according to claim 1 wherein said inert organic liquid is benzene.

6. A process according to claim 1 wherein said inert organic liquid is carbon tetrachloride.

7. A process according to claim 1 wherein said inert organic liquid is n-hexane.

PETER LIONEL BRAMWYCHE.
MARTIN MUGDAN.
HERBERT MUGGLETON STANLEY.

REFERENCES CITED

The following references are of record in the file of this patent:

UNITED STATES PATENTS

| Number | Name | Date |
|---|---|---|
| 1,850,836 | Guinot | Mar. 22, 1932 |
| 2,183,317 | Auden et al. | Dec. 12, 1939 |
| 2,321,094 | MacDowell et al. | June 8, 1943 |
| 2,360,957 | MacDowell et al. | Oct. 24, 1944 |
| 2,374,494 | Morey | Apr. 24, 1945 |

FOREIGN PATENTS

| Number | Country | Date |
|---|---|---|
| 543,030 | Great Britain | Feb. 6, 1942 |
| 785,791 | France | May 27, 1935 |